United States Patent [19]

Scheffel

[11] Patent Number: 4,739,797
[45] Date of Patent: Apr. 26, 1988

[54] HYDRAULIC PISTON-VALVE-TYPE CONTROL VALVE

[75] Inventor: Gerd Scheffel, Korschenbroich, Fed. Rep. of Germany

[73] Assignee: Parker Hannifin NMF GmbH, Cologne, Fed. Rep. of Germany

[21] Appl. No.: 857,697

[22] Filed: Apr. 29, 1986

[30] Foreign Application Priority Data

Apr. 30, 1985 [DE] Fed. Rep. of Germany ....... 3515563

[51] Int. Cl.$^4$ ............................................. F15B 13/04
[52] U.S. Cl. ............................. 137/625.69; 137/625.3
[58] Field of Search ......................... 137/625.3, 625.69

[56] References Cited

U.S. PATENT DOCUMENTS

| 2,702,529 | 2/1955 | Doerfner | 137/625.69 |
| 2,958,340 | 11/1960 | Rosebrook | 137/625.69 |
| 3,072,149 | 1/1963 | Hasbany | 137/625.09 |
| 3,174,510 | 3/1965 | Nelson | 137/625.69 |
| 3,323,421 | 6/1967 | Olmsted | 137/625.69 X |
| 3,463,187 | 8/1969 | Rue | 137/596.2 |
| 3,536,291 | 10/1970 | Newton | 137/625.69 X |
| 3,807,454 | 4/1974 | Westveer | 137/625.69 |
| 3,971,216 | 7/1976 | Miller | 137/596.13 X |
| 4,008,737 | 2/1977 | Kluczynski et al. | 137/625.69 X |
| 4,089,169 | 5/1978 | Miller | 137/596.13 X |
| 4,371,002 | 2/1983 | Tischer | 137/625.69 X |

FOREIGN PATENT DOCUMENTS

| 3129594 | 2/1983 | Fed. Rep. of Germany . |
| 3205860 | 8/1983 | Fed. Rep. of Germany . |
| 2717384 | 12/1983 | Fed. Rep. of Germany . |
| 2195 | of 1909 | United Kingdom | 137/625.69 |
| 10522 | of 1912 | United Kingdom | 137/625.69 |
| 1011751 | 12/1965 | United Kingdom | 137/625.69 |

Primary Examiner—Gerald A. Michalsky
Attorney, Agent, or Firm—Christopher H. Morgan

[57] ABSTRACT

A hydraulic piston-valve-type control valve that includes a housing in which a control piston is longitudinally displaceably disposed. By means of annular recesses, and hence control surfaces formed on piston collars about a piston core, the control piston regulates at least one fluid stream that flows through the housing. This regulation is effected by coupling the recesses between the piston collars, while appropriately longitudinally shifting the control piston, with annular control chambers on the housing side. The collars of the control piston are provided with control edges that progressively release the control chambers. The problem with heretofore known valves was that an undesired sudden increase in the flow forces could not be avoided. In addition, the manufacture of the corresponding configurations of the control edges was complicated and expensive. To remedy this problem, the course of the control edges that release or close the control chambers on the housing side, when viewed in the circumferential direction of the control piston, has no segment that extends linearly and at right angles to the center line of the piston. Each control edge follows a symmetrical course relative to a central cross section taken through its circumferential development, and each control edge also at least twice provides for the full cross-sectional opening area of the control piston.

5 Claims, 1 Drawing Sheet

U.S. Patent    Apr. 26, 1988    4,739,797
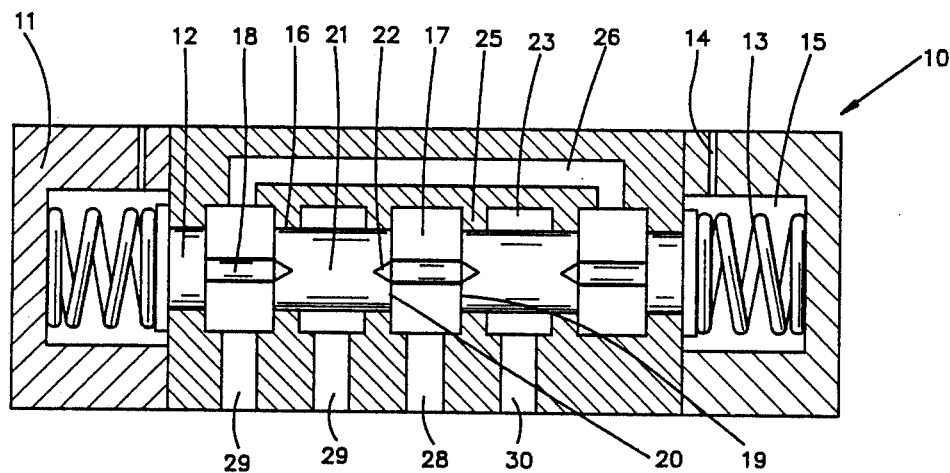
FIG.1
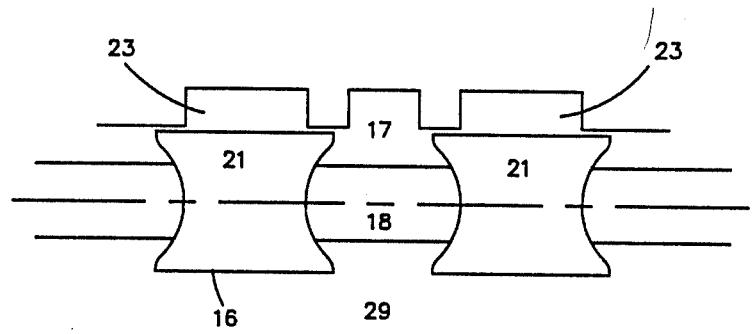
FIG.2
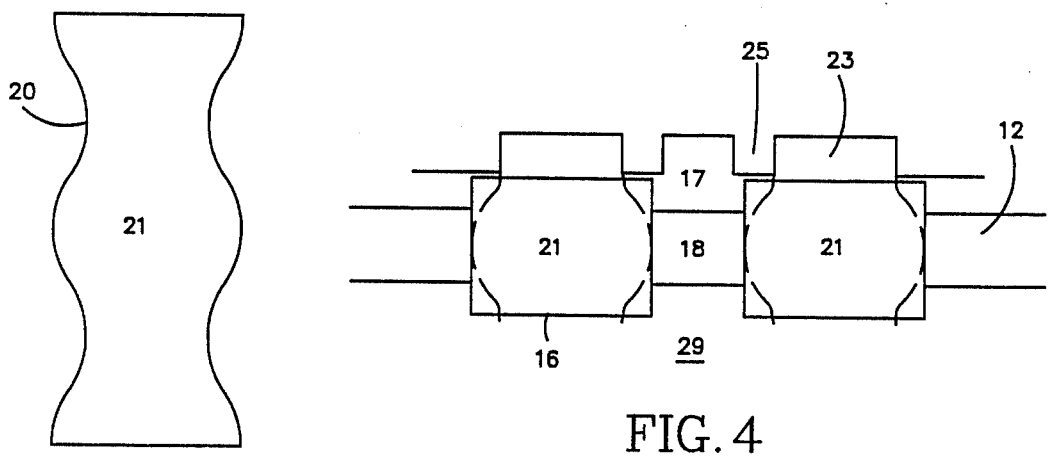
FIG.3
FIG.4

HYDRAULIC PISTON-VALVE-TYPE CONTROL VALVE

BACKGROUND OF THE INVENTION

The present invention relates to a hydraulic piston-valve-type control valve that includes a housing in which a control piston is longitudinally displaceably disposed. By means of annular recesses, and hence control surfaces that are formed on piston collars about piston cores, the control piston regulates at least one fluid stream that flows through the housing. Regulation is effected by coupling the recesses between the piston collars with annular control spaces on the housing side via appropriate longitudinal displacement of the control piston. The piston collars are provided with control edges that progressively release or open the control spaces or chambers.

Control valves of this general type are known from German Pat. No. 27 17 384 and German Offenlegungsschrift No. 32 05 860. Both control valves are so-called continuous or step slide valves that provide a fine controllability of the valve by providing the control edges with triangular recesses which, relative to the cross section of the control surfaces, generally have the three-dimensional shape of a half cone. With such piston geometries, during the opening stroke or movement of the valve piston, the control edges of the latter, beginning from the tip of the triangular recess, progressively release the control spaces or chambers disposed in the housing annularly about the piston. As a result, where smaller current flows are involved, it is possible to have a fine control of the valve with the desired precision. Furthermore, the known course for the control edges is suppose to prevent a breakdown or turbulence of the fluid flow at the control edges, as occurs with linear control edges that cooperate with the control chambers in the so-called neutral section. Inherent to such a breakdown of the fluid flow is a force imbalance in the direction of flow of the medium. In contrast to the desired fine control, such an imbalance tends to force the opening movement of the piston forward in an abrupt manner.

The drawback of providing the configuration of the control edges as triangular recesses, i.e. of providing the control surfaces as semi-conical recesses, is that although in the triangular region of the control edges it is possible to realize a fine control of the valve, when the control piston is extended out of this region, and when the full open position is achieved, the volume flow of the medium is increased in an abrupt manner, resulting in the undesired sudden increase of the flow forces. Another drawback of the known configuration of the control edges is that such a configuration is expensive to manufacture. Above all, the known configuration for the control edges or recesses, requires considerable milling effort relative to the control surfaces since the opening stroke characteristic of the control valve depends to a critical extent upon the precision of the configuration of the control edges or control surfaces. Since the piston is a hardened component, the hardening process that follows milling of the course of the control edges or control surfaces again conveys imprecision related to this hardening process into the workpiece.

It is an object of the present invention to improve a valve of the aforementioned general type in such a way that while providing good fine controllability of the valve, sudden movements of the flow forces are avoided. At the same time, the valve, and in particular the piston thereof, should be easier to manufacture in a more precise manner.

BRIEF DESCRIPTION OF THE DRAWING

These objects, and other objects and advantages of the present invention, will appear more clearly from the following specification in conjunction with the accompanying schematic drawing, in which:

FIG. 1 illustrates a state of the art hydraulic control valve;

FIG. 2 is a partial enlargement of a section through one inventive embodiment of a control piston, and shows the adjoining control spaces; and FIG. 3 shows an inventive modification of two control edges along a piston collar.

FIG. 4 shows the reversal of the embodiment according to FIG. 2.

SUMMARY OF THE INVENTION

The control valve of the present invention is characterized primarily in that the course of the control edges that release or close the control spaces or chambers on the housing side, when viewed in the circumferential direction of the control piston, has no segment that extends linearly and at right angles to the center line of the piston; each control edge follows a symmetrical course relative to a central cross section taken through its circumferential development, and each control edge also at least twice provides for the full cross-sectional opening area of the control piston. In one preferred embodiment, the control edges release the full cross-sectional opening area of the piston several times.

Although German Offenlegungsschrift No. 31 29 594 discloses a valve having individual connecting bores, with a comparable characteristic of the flow forces being achieved by rotating the piston slide valve abouts its longitudinal axis accompanied by simultaneous inclination of the control surface, this known valve cannot be used with valves of the initially mentioned type having annular control spaces due to the irregular coupling provided by these known valves. Furthermore, due to the lack of symmetry of the course of the control curves, it is not possible to uniformly apply the effective control forces against the control surfaces. In contrast, the fine control that can be achieved pursuant to the present invention presupposes an equilibrium of forces in the control piston in every control position.

The inventive course of the control edges at the collars of the control piston involves the advantage that the increase of the cross-sectional flow area for the medium is effected progressively up to complete release of the cross-sectional opening area of the control spaces, without a sudden change in direction of the control edges resulting. This means that the characteristic of the flow forces as a function of the cross-sectional opening area also has a progressive, break-free course, thus assuring that a sudden increase of the flow forces, accompanied by the aforementioned drawbacks for the control of the valve, is reliably avoided.

Pursuant to one preferred embodiment of the present invention, the control edge widens from the closure position of the piston, i.e. that position where the piston completely covers the control chambers or spaces on the housing side, in a curve-like manner pursuant to a half-periodic sinusiodal curve up to the complete cross-sectional opening area. With such a configuration of the control edges or the control surfaces that follow the course of the control edges, there is involved the particular advantage that the valve can be controlled even more precisely since small changes in the stroke or movement of the piston lead to relatively much greater changes in the cross-sectional area in the region of the control edge and the control spaces on the side of the housing than was the case with the state of the art valves.

A further advantage of the inventive configuration is the simple manufacture of the control edges or control surfaces, since the latter, and during preparation of the recesses from the solid piston cross section, can be produced by being turned in a single operation, such as on a lathe. The subsequent hardening of the surfaces of the piston, including the control surfaces and control edges, causes no inaccuracies or untrueness due to the progressive transitions.

Furthermore, as a reversal of the way the components conform to one another, it is possible to embody the control edges of the piston as linearly extending edges, while at the same time the edges of the lands or raised portions between the control spaces on the housing side are embodied in the inventive fashion, so that the same advantageous effects result when the control edges and the lands cooperate (FIG. 4).

Finally, it should be noted that the present invention is not limited to the aforementioned continuous valves, but can also be used for all hydraulic piston-valve-type valves, since independent of a continuous course of the opening characteristics with all piston-valve-type valves, every type of undesired and to be avoided control oscillations due to a sudden increase of the flow forces is in fact avoided.

Further advantageous features of the present invention will be described in detail subsequently.

DESCRIPTION OF PREFERRED EMBODIMENTS

Referring now to the drawing in detail, FIG. 1 illustrates the so-called main stage 10 of a continuous slide valve that has piston-valve-type directional control, with the movement sequence of the latter being controllable by a non-illustrated preliminary control mechanism. The main stage 10 is provided with a housing 11 in which a piston 12 is movably disposed. The piston 12 is held in the position of rest by two centering springs 13 that are supported against the housing 11. At the opposite ends of the piston 12, chambers 15 are provided in the housing 11 for accommodating the centering springs 13. The chambers 15 are provided with bores 14, each of which provides communication to the non-illustrated hydraulic preliminary control mechanism.

An axial guide bore 16 is formed in the housing 11 of the main stage 10 for the control piston 12. In this embodiment, the piston 12 is provided with three spaced-apart annular recesses 17, so that two piston shoulders or collars 21, which have the full cross-sectional area of the piston, result between the recesses 17. In an annular fashion, the recesses 17 encircle a piston core 18, resulting in control surfaces 19 that extend radially from the piston core 18. The outer edge of the control surfaces 19, in the form of a control edge 20, slides sealingly along the inner surface of the axial guide bore 16. In the construction shown in FIG. 1, which corresponds to the state of the art, the control edges 20 are provided with triangular recesses 22, with a plurality of the latter being distributed at a distance from one another in the course of the control edge 20 that passes over the piston collar 21. In the direction toward the piston core, the recesses 22 have a semi-conical shape.

On the housing side, the piston structure 12 is surrounded by control spaces 23 that are formed in the housing 11 and extend around the control piston 12 in an annular fashion. Via connecting bores 27 to 30, the control spaces 23 are connected with units that are located beyond the valve, and are therefore not illustrated, such as tanks, pumps, consumers, etc. By way of example, the bore 27 can be the connection to a tank, the bore 28 can be the connection to a pump, and the connections 29 and 30 can each be connected to a consumer. Lands or raised portions 25 are disposed between the control spaces 23 that are recessed along the axial bore 16 in the housing 11. These lands 25 cooperate with the control edges 20 of the piston 12 during axial movement of the latter. By additional supply, and for pressure equalization, two of the recesses 17, starting from the tank bore 27, are connected by a control channel 26.

FIG. 2 illustrates the inventive configuration of the control piston. In particular, FIG. 2 shows a cut-away portion of the control piston 12 with a piston core 18, on both sides of which are piston shoulders or collars 21 having two recessed control surfaces 19. The recess 17 disposed between the control surfaces 19 communicates with one of the control spaces 23 on the housing side, as well as with the connecting bore 28. In place of a plurality of triangular recesses 22, the control edges 20 of the piston collars 21 of the inventive configuration follow a course that has no sudden changes in direction; in particular, these control edges 20 extend in the manner of a sinusoidal curve that constricts the width of a given piston collar 21.

The course of the control edge 20 becomes more evident in FIG. 3, which shows a modification of a piston collar 21. In this embodiment, it can be seen that along a piston circumference of 360 degrees, the control edge 20 twice has a sinusoidal wave or oscillation of a half cycle.

The inventive valve operates as follows:

In the central or neutral position of the piston 12 in the housing 11, as effected by the centering springs 13, the connecting bores 27 and 28 are open to the tank and the pump, since the associated control spaces 23 communicate with the pertaining recesses 17 of the piston 12. Applying control oil pressure delivered by the preliminary control mechanism to one of the two bores 14 leads to an axial displacement of the piston 12 counter to the force of that centering spring 13 disposed on that side of the piston 12 that is opposite the control oil inlet. This axial displacement is effected until communication results between one of the two consumers 29, 30 with the pump side 28, or between the other consumer 29, 30 and the tank side 27 (assuming a properly dimensioned illustration). When the control spaces 23, especially those under pressure, are opened as a result of the axial movement of the piston 12, the medium begins to flow over to the position of the deepest indentation of the course of the control edge 20. As a result of further axial movement, progressively increasingly more of the cross-sectional opening area is released, effecting a continuous increase of the quantity flow, and hence of the effective flow forces. This process is carried out progressively until the position of the complete cross-sectional opening area illustrated in FIG. 2 is reached, without effecting an abrupt increase of the cross-sectional area at the piston collar, thus avoiding a similarly abrupt increase in the flow forces.

It is to be understood that any desired configuration of the course of the control edges is within the scope of the present invention as long as such a configuration avoids a sudden change in direction of the course of the control edges, and hence an abrupt increase of the flow forces. Thus, for example, such a configuration also includes, in particular, a linear course in place of the curved path of the control edges, as long as between them no linearly extending portion is disposed in the direction of the transverse axis of the piston.

Finally, in the embodiment pursuant to FIG. 2, the control surfaces 19 extend radially with respect to (normal to the cylindrical surface of) the piston core 18, so that due to the sinusoidal curve of the control edge 20, a cross-sectional opening area of the piston 12 results as far as its piston core 18. A further advantageous fine adjustment or tuning of the valve is possible by disposing the control surfaces at an angle to the piston core, and in particular in such a way that a progressive release of the cross-sectional flow area also results in the radial direction.

Referring to FIG. 4, an alternate embodiment of the present invention is shown with axially curving, sinusoidal control edges 31 being provided on the radially inner edges of the control spaces 23. The piston collars 21 are cylindrical with circular edges 20 and with planer control surfaces 19 extending at right angles to the axis of the piston core 18. Thus, the configuration of the inner and outer control surfaces are essentially reversed in the embodiment of FIG. 4, but the resulting smoothly controlled operation is the same.

The present invention is, of course, in no way restricted to the specific disclosure of the specification and drawing, but also encompasses any modifications within the scope of the appended claims.

What is claimed is:

1. A hydraulic piston-valve-type control valve, comprising:

a housing provided with annular control spaces; and
   a cylindrical control piston that is longitudinally displaceably disposed in said housing; said control piston being provided with annular recesses, so that said control piston is configured with alternating piston core and piston collar sections, with control surfaces being formed on said piston collars about said piston cores; said control surfaces having control edges at a radially outer extent thereof, said control edges curving smoothly and uninterruptedly at least twice from an initial opening axial extent to a full open axial extent without any segment thereof extending linearly at right angles to the centerline of said piston; so that a flow of fluid between said annular recesses through said annular control spaces can be smoothly and precisely quantitatively controlled from an initial opening to a full opening by the relative longitudinal displacement of said control piston in said housing to position said smoothly curving control edges of said collar sections with respect to said control spaces.

2. The control valve of claim 1 wherein said control edges curve sinusoidally.

3. The control valve of claim 1 wherein said control edges curve sinusoidally and where said control surfaces extend radially with respect to the axis of said control piston.

4. The control valve of claim 3 wherein the sinusoidally curved control edges are symmetrical across the piston.

5. The control valve of claim 4 wherein the sinusoidally curved control edges twice have a sinusoidal wave of a half cycle.

* * * * *